United States Patent [19]

Hughes et al.

[11] Patent Number: 5,223,592
[45] Date of Patent: Jun. 29, 1993

[54] PROCESS FOR POLYMERIZATION OF ITACONIC ACID

[75] Inventors: Kathleen A. Hughes; Graham Swift, both of Blue Bell, Pa.

[73] Assignee: Rohm and Haas Company, Philadelphia, Pa.

[21] Appl. No.: 676,056

[22] Filed: Mar. 27, 1991

[51] Int. Cl.⁵ .................. C08F 130/04; C08F 122/02
[52] U.S. Cl. .................................. 526/240; 526/318.2
[58] Field of Search ............................ 526/318.2, 240

[56] References Cited

U.S. PATENT DOCUMENTS 2,294,226 8/1942 D'Aiello .
3,560,529 2/1971 Blumbergs et al. .
5,032,646 7/1991 Walinsky ........................ 525/329.6

OTHER PUBLICATIONS

Journal of Organic Chemistry by C. S. Marvel & Thomas H. Sheperd, vol. 24, pp. 599–605 (1959).

Die Makromolekulare Chemie 111 by H. Nakamoto, Y. Ogo & T. Imoto, pp. 104–114 (1968).
Susumu Nagai and Keinosuke Yoshida, Kobunshi Kagaka 17, 746, 748–52, 1960.
CA 55:24086g, 1961.
B. L. Gafurov, L. N. Semenova, and M. A. Askavov, "Polymerization of itaconic acid in solvents," Uzb. Khim. Zh., 15(5), 71–4, 1971.
CA 76(20):113635y, 1971.

*Primary Examiner*—Joseph L. Schofer
*Assistant Examiner*—Wu C. Cheng
*Attorney, Agent, or Firm*—Marvin J. Powell

[57] ABSTRACT

Polymers of itaconic acid are formed at high conversion by adding completely neutralized monomer solution and initiator solution to a vessel initially containing water at a temperature sufficient for polymerization. These polymers are biodegradable and are most useful as detergent additives, scale inhibitors and removers, sequesterants, yarn sizers, deflocculating agents, deinking agents, suspending agents and dispersing agents.

8 Claims, No Drawings

000
PROCESS FOR POLYMERIZATION OF ITACONIC ACID

FIELD OF THE INVENTION

This invention relates to polymers of itaconic acid and, more particularly, to a novel process carried out with completely neutralized itaconic acid for the preparation, at high conversion, of biodegradable polymers. Polymers made by this process are suitable for use as detergent additives, scale inhibitors and removers, sequestrants, yarn sizers, deflocculating agents, de-inking agents, suspending agents and dispersing agents.

BACKGROUND OF THE INVENTION

Several processes for the preparation of polymers of itaconic acid are known in the art. However, while the prior art processes have had some impact on resolving inherent difficulties in polymerizing this dicarboxylic acid, low polymerization conversion of the acid continues to be a problem. High levels of unpolymerized monomers in the final product raise serious environmental concerns and cause significant application problems.

DESCRIPTION OF THE PRIOR ART

While it is known in the art that a number of processes exist for the preparation of itaconic acid polymers, many of the processes suffer from an inherent significant shortcoming—high levels of unpolymerized monomers remain in the final product after polymerization. Additionally, many of the processes are known to be difficult, erratic, inconsistent and in one instance where a detonatable initiator is employed, hazardous to practice.

Marvel and Shepherd, in the *Journal of Organic Chemistry*, vol. 24, pp. 599-605 (1959), describe the first polymerization of itaconic acid in dilute hydrochloric acid, using potassium persulfate as the catalyst. However, the problem with this polymerization process was that it took a number of days to complete the process, and conversion of the itaconic acid was only 35 percent. This means that 65 percent of the acid remained unpolymerized. This made the process commercially unacceptable.

U.S. Pat. No. 2,294,226 describes the polymerization dimethyl itaconate as the dipotassium salt by refluxing it with alcoholic potassium hydroxide, and subsequently hydrolyzing it to produce polyitaconic acid. This patent claims that the polyitaconic acid obtained by treating this salt with inorganic acids is water soluble.

Nakamoto, Ogo and Imoto, in Chemie III, pp. 104-114 (1968), describes radical polymerization of itaconic acid in various solvents under high pressure, 5000 kg/cm$^2$. However, the polymerization process resulted in a 50 percent conversion and required specialized equipment. This made the process costly and commercially unfeasible.

U.S. Pat. No. 3,560,529 describes the polymerization of itaconic anhydride. This patent claims to have resolved two problems: (1) it identified a suitable initiator and; (2) the process could be practiced under ambient conditions without the need of costly pressurized equipment. However, conversion of itaconic acid was found to be erratic, unreliable and inconsistent.

U.S. Pat. No. 3,055,873 describes a method of polymerizing monoalkyl itaconate with hydrolysis of the poly(monoalkyl itaconate) and finally the precipitation of the itaconic acid. However, the process resulted in 75 percent conversion, leaving 25 percent of the monomer unpolymerized.

While prior art processes made significant improvements in the production of polymers of itaconic acid, further improvements were required. It is therefore an object of the present invention to produce polymers of itaconic acid at high conversion. Another object of the present invention is to complete the polymerization in a significantly shorter period of time and with relative ease and consistency. Still another object of the present invention to is produce polymers that are biodegradable. It is still a further object of the current invention to produce environmentally acceptable itaconic acid polymers having low residual monomers in the final product.

SUMMARY OF THE INVENTION

The present invention provides an aqueous batch or continuous process for the preparation, at high conversion, of polymers of itaconic acid by carrying out the polymerization process using completely neutralized itaconic acid. With significantly less unpolymerized monomers remaining in the final product, environmental concerns are minimized and product performance is improved. In addition, the novel process of the present invention is completed over a shorter period of time, when compared to the prior art, and is accomplished with relative ease and consistency. Additionally, high conversion of the itaconic acid will lower the cost of production by reducing the amount of unpolymerized monomer in the final product.

The process of the present invention is carried out by charging a reactor containing water with completely neutralized monomer solution. The reactor is heated followed by the gradual addition, at substantially uniform addition rates, of an initiator solution. The reaction is completed usually in about two hours. In a variation of the process of the invention, the initiator solution and the monomer solution are added at substantially uniform addition rates, linearly, and as separate solutions.

Polymers synthesized according to the process of the present invention are biodegradable and are useful as detergent additives, scale inhibitors and removers, sequesterants, yarn sizing, deflocculating agents, de-inking agents, suspending agents and dispersing agents.

Copolymers of itaconic acid and acrylic acid produced by the process of the present invention can also be used as powder detergent additives because they are safe, cost effective and efficient at controlling crystal growth during the wash cycle.

DETAILED DESCRIPTION OF THE INVENTION

We have discovered that when completely neutralized itaconic acid is polymerized according to the process of this invention, high conversion of the acid to its homopolymers is achieved. The homopolymers of this process are biodegradable and have a weight average molecular weight of less than about 10,000 while the preferred molecular weight is less than about 5000. Molecular weights referred to hereinafter are all weight average molecular weights unless stated otherwise.

Polymers of the present invention are formed by charging a reactor with deionized water and with completely neutralized monomer solution, heating the reactor to raise the temperature, and adding, at substantially uniform addition rates, an initiator. An alternative variation of the present invention requires charging a reactor initially with water, heating the reactor to increase the temperature, and adding completely neutralized monomer solution and initiator solution at uniform addition rates, preferably linearly and as separate solutions.

The critical aspect of the present invention is the complete neutralization of the itaconic acid monomer solution prior to conducting the polymerization reaction. "Complete neutralization" requires two moles of base neutralizer for each mole of itaconic acid. For example, two moles of sodium hydroxide are required to neutralize one mole of itaconic acid. However, when a divalent base is used to neutralize the itaconic acid, such as for example calcium hydroxide, only one mole is required to neutralize each mole of itaconic acid. Any base may be used to neutralize itaconic acid to its itaconate salts. Suitable bases include sodium hydroxide, potassium hydroxide, lithium hydroxide, ammonium hydroxide and the like. Organic materials such as amines may also be used as neutralizers.

The itaconic acid monomer is neutralized from about 80 to about 100 percent. This is accomplished by adding to the monomer solution from about 80 to about 120 equivalent percent of the neutralizing solution. The neutralized monomer solution is prepared by adding the neutralizer to a reactor charged with deionized water and itaconic acid. Since the addition of the neutralizer results in an exothermic reaction, the neutralizer should be added slowly to the reactor or the reactor may be cooled with ice while slowly adding the neutralizer. The resulting monomer solution is completely neutralized.

Initiators useful in the polymerization process of this invention include all initiators which decompose within the polymerization temperature of this invention, such as for example sodium persulfate, ammonium persulfate, potassium persulfate and the like; perphosphates, such as sodium, ammonium, potassium and the like are also useful as initiators; tertiary butyl hydroperoxide, hydrogen peroxide and the like may also be used. The initiators of this process are water soluble and are prepared in solution by charging a reactor with deionized waste and dissolving the initiator in the water charge. The concentration of these initiators is from 0.5 to 20.0 percent by weight of active initiator on monomer, preferably from 1 to 10 percent by weight of the total monomer concentration. Preferred initiators are water soluble persulfate salts including mixtures and solutions thereof.

The polymerization is run to about 10 to 80 weight percent solids and most preferably to about 30 to 60 percent solids. Polymerization temperatures are between 50° to 200° C. and most preferably from 80° to 200° C.

Polymers of this invention are useful as detergent additives since they prevent redeposition of soil during laundering. The polymers are most effective when added to detergent compositions based on surfactants, including anionic, nonionic, zwitterionic, ampholytic surfactants and mixtures thereof; builders, including zeolites, silicates, carbonates, phosphates, perforates and mixtures thereof; and, optionally, adjuvants such as perfumes, colorants, fatty acids, fluorescent whiteners, opacifiers and the like.

Additionally, the polymers of this invention form clear, tough films, and can be applied from aqueous solutions in the sizing of yarn to impart abrasion resistance for weaving. The film is then removed from the yarn after weaving by dissolving the polymer with water. Polymers of the present invention are also suitable as deflocculating agents for paper making. They may also be used as de-inking agents in newspaper repulping and as dispersing agents in latex paints, ceramics and glazes. The polymers may be used as suspending agents for aqueous insecticide emulsions since their adhesive properties help to hold the insecticide on the treated surface. Polymers of the present invention may be further used as scale inhibitors and dispersants for water treatment applications and are especially useful inhibitors for barium sulfate formations in oil well drilling applications. These polymers can also be used as dispersants for inorganic particulates, such as kaolin clay, calcium carbonate, zeolites, titanium dioxide and the like.

An additional advantage of the polymers produced by the process of this invention is that they are biodegradable. A biodegradable synthetic polymeric detergent additive is preferred since the use of nonbiodegradable polymeric additives raise serious environmental concerns due to the uncontrolled build-up of polyacids.

The examples provided herein are intended to illustrate the process of this invention that produces polymers of itaconic acid at high conversion, polymers that are biodegradable, and polymers that improve application performance, while using a process that is relatively easy to practice with polymerization over a shorter period of time when compared to the prior art. However, the examples should not be interpreted in any way to limit the scope of the invention. Where noted, ratios of itaconic acid to acrylic acid are given as weight percent based on total monomer charge.

EXAMPLE 1

To a two liter, four neck round bottom flask equipped with a mechanical stirrer, reflux condenser, thermometer and addition funnels, was added 150 grams of deionized water. The flask was heated to 90° C. A monomer solution of 265 grams of itaconic acid, 160 grams of 50 percent NaOH and 350 grams of deionized water prepared. An initiator solution of 20 grams sodium persulfate and 75 grams of deionized water was also prepared. The monomer and initiator solutions were fed into the flask linearly and separately over 2 hours, while maintaining the flask at a temperature sufficient to continue to reflux the mixture, about 100° C. When the addition was complete, the polymer solution was held at the reflux temperature for an additional 30 minutes. The polymer solution was cooled and packaged.

The resultant polymer solution showed 98.8 percent conversion of the itaconic acid. Unpolymerized residual itaconic acid content was 1.2 percent. The resultant polymer had a solids content of 30.2 percent and a pH of 4.6. Based on gel permeation chromatography (GPC), the weight average molecular (Mw) was 1960, and the number average molecular weight (Mn) was 1640.

EXAMPLE 2

The procedure of Example 1 was repeated except that a monomer solution containing 265 grams of itaconic acid, 160 grams of deionized water and 160 grams of 50 percent NaOH was added to 150 grams of deionized water. An initiator solution of 20 grams of sodium persulfate and 75 grams of deionized water was prepared. The initiator solution was fed into the flask over 2 hours while maintaining the flask at a temperature sufficient to continue to reflux the mixture—about 100° C. When the addition was complete, the polymer solution was held at the reflux temperature for an additional 30 minutes, then cooled. The polymer solution was diluted with 250 grams of deionized water and post-neutralized with 31 grams of 50 percent NaOH to a final pH of 7.

The resultant polymer solution showed 98.8 percent conversion of the itaconic acid. Unpolymerized residual itaconic acid content was 1.2 percent. The resultant polymer had a solids content of 30 percent and a pH of 6.7. Based on GPC, the Mw was 4500 and Mn was 3390.

EXAMPLE 3

The procedure for Example 2 was repeated. The resultant polymer solution showed 99.3 percent conversion of the itaconic acid. Unpolymerized residual itaconic acid content was 0.7 percent. The resultant polymer solution had a solids content of 29.9 percent and a pH of 7. The Mw was 3810 and the Mn was 3080.

Biodegradation of the resultant polymer solution was 44.6 percent. This was based on biological oxygen demand (BOD) testing for 47 days.

Biodegradation Testing

Polymer degradability was measured on a scale of 0 to 100 percent based on BOD testing. The BOD procedure is the method described in *Standard Methods for the Examination of Water & Wastewater*, page 525, 16th edition (1985).

The BOD test used was a closed bottle test whereby a solution of the resultant polymer and mineral salt was inoculated with municipal sewage bacteria. Biodegradation was indicated by oxygen uptake. The oxygen uptake was determined by measuring the dissolved oxygen content of the solution. BOD test results are provided for 5 mg/300 ml concentrations for the duration of test.

EXAMPLE 4

To a two liter, four neck round bottom flask equipped with a mechanical stirrer, reflux condenser, thermometer and addition funnels was added 160 grams of deionized water and 265 grams of itaconic acid. The flask was heated to the reflux temperature—about 100° C. An initiator solution of 20 grams of sodium persulfate and 75 grams of deionized water was prepared. The initiator solution was fed into the flask linearly over 2 hours while maintaining the flask at a temperature sufficient to continue to reflux the mixture—approximately 90° C. When the addition was complete, the polymer solution was held at the reflux temperature for an additional 30 minutes. The polymer solution was cooled to 50° C. 270 grams of 50 percent NaOH was added to the flask while the temperature was maintained at less than 70° C. When the post-neutralization was complete, the polymer solution was cooled and packaged.

The resultant polymer solution showed 88.0 percent conversion of the itaconic acid. Unpolymerized residual itaconic acid content was 12.0 percent. The resultant polymer solution had a solids content of 47.9 percent and a pH of 7.4. The Mw was 2540 and the Mn was 2220.

EXAMPLE 5

To a two liter, four neck round bottom flask equipped with a mechanical stirrer, reflux condenser, thermometer and addition funnels was added 150 grams of deionized water and 265 grams of itaconic acid. An initiator solution of 20 grams of sodium persulfate and 75 grams of deionized water was prepared. A base solution of 320 grams of 50 percent NaOH was also prepared. The initiator solution and the base solution were fed into the flask linearly and separately over 2 hours while maintaining the flask at a temperature sufficient to continue to reflux the mixture of about 100° C. When the addition was complete, the polymer solution was held at the reflux temperature for an additional 30 minutes, cooled and packaged.

The resultant polymer solution showed 92.6 percent conversion of the itaconic acid. Unpolymerized residual itaconic acid content was 7.4 percent. The resultant polymer solution had a solids content of 46.9 percent and a pH of 13.9. The Mw was 2620 and the Mn was 2260.

EXAMPLE 6

The procedure for Example 5 was repeated except that 160 grams of 50 percent NaOH was prepared as the base solution. When the addition was complete, the polymer solution was held at the reflux temperature for an additional 30 minutes. The polymer solution was cooled to about 50° C. and post-neutralized with 83 grams of 50 percent NaOH. The polymer solution was further cooled and packaged.

The resultant polymer solution showed 91.3 percent conversion of the itaconic acid. Unpolymerized residual itaconic acid content was 8.7 percent. The resultant polymer solution had a solids content of 47.1 percent and a pH of 7.1. The Mw was 2570 and the Mn was 2220. Residual itaconic acid content was 8.7 percent.

EXAMPLE 7

The procedure of Example 2 was repeated except that a monomer solution containing 265 grams of itaconic acid and 165.5 grams of 50 percent NaOH were added to the 150 grams of deionized water. When the addition of the initiator solution was complete, the polymer solution was cooled to about 50° C. and post-neutralized with 74.9 grams of 50 percent NaOH.

The resultant polymer solution showed 92.5 percent conversion of the itaconic acid. Unpolymerized residual itaconic acid content was 7.5 percent. The resultant polymer solution had a solids content of 46.9 percent and a pH of 7.1. The Mw was 2860 and the Mn was 2440.

EXAMPLE 8

Copolymer of Itaconic Acid and Acrylic Acid

To a two liter, four neck round bottom flask equipped with a mechanical stirrer, reflux condenser, thermometer and addition funnels was added 150 grams of deionized water. The flask was heated to 90° C. A monomer solution of 212 grams of itaconic acid, 53 grams of acrylic acid, 189 grams of 50 percent NaOH and 241 grams of deionized water was prepared. An initiator solution of 20 grams sodium persulfate and 75 grams of deionized water was also prepared. The comonomer and initiator solutions were fed into the flask linearly and separately over 2 hours while maintaining the flask at a temperature sufficient to continue to reflux the mixture, about 100° C. When the addition was complete, the copolymer solution was held at the reflux temperature for an additional 30 minutes. The copolymer solution was cooled and packaged.

EVALUATION OF POLYMERS

Water Treatment-Barium Sulfate Scale Inhibition at pH of 4

The following samples demonstrate the superior performance of itaconic acid polymers of this invention at preventing the formation of barium sulfate scale in aqueous systems at low pH and high salt concentrations. These conditions are typically found in oil-well drilling operations and paper manufacturing processes.

Polymer Solution Preparation

A 0.1% active polymer solution based on acid was prepared. The pH of 8 oz. aliquots was adjusted to pH 5.5 with dilute HCl or NaOH as necessary.

Salt Solution A Preparation

The preweighed salts and/or solutions were added to a two liter volumetric flask in the order listed:
4.86 1% $SrCl_2.6H_2O$
3.14 g $CaCl_2.2H_2O$
22.88 g $MgCl_2.6H_2O$
1.76 g KCl
47.91 g NaCl
0.34 g $NaHCO_3$
8.75 g $Na_2SO_4$ The two liter flask was then filled to the mark with deionized water and mixed well. Solution A was filtered through a 0.45 micron filter and then carbon dioxide ($CO_2$) was bubbled through the solution for 2-3 hours. The pH was adjusted to 4.0 with hydrochloric acid (HCl) as necessary.

Salt Solution B Preparation

The preweighed salts and/or solutions were added to a second two liter volumetric flask in the order listed:
8.96 g 1% $BaSO_4$
3.49 g $SrCl_2.6H_2O$
20.62 g $CaCl_2.2H_2O$
8.43 g $MgCl_2.2H_2O$
1.42 g KCl
148.34 g NaCl
1.37 g $NaHCO_3$
3.40 g 1% $NaSO_4$ The two liter flask was then filled to the mark with deionized water and mixed well. Solution B was filtered through a 0.45 micron filter and then carbon dioxide ($CO_2$) was bubbled through the solution for 2-3 hours. The pH was adjusted to 4.0 with hydrochloric acid (HCl) as necessary.

Sample Preparation 50 ml of Solution A was added to a four ounce jar. 3 ml of polymer solution was added to the jar and the solution was mixed well. Finally, 50 ml of Solution B was added to the jar, the contents were mixed, and the solution was placed in a 90° C. water bath for 16 hours. 10 ml of the mixture was filtered through a 0.45 micron filter into 100 ml volumetric flask.

Samples containing no polymer were prepared as a control. Also, samples containing no barium were prepared by replacing Solution A with polished deionized water.

The level of barium sulfate present in the samples was determined by atomic absorption. The precent inhibition measures the amount of barium at low pH which did not precipitate out of solution.

$$\frac{\text{Amount Ba++ in sample (ppm)}}{\text{ppm value for 100\% inhibition}} \times 100 = \% \text{ Inhibition}$$

| Barium Sulfate Precipitation Inhibitors at pH = 4 | | | |
|---|---|---|---|
| Sample | Composition | Mw | % Inhibition |
| Control 1: No Polymer | — | — | 3 |
| Control 2: Acrylic Polymer | 70 AA/30 MAA* | 4500 | 12 |
| Control 3: Phosphonate | DETPMP** | 573.0 | 11 |
| Example #3 | Polyitaconic Acid | 3700 | 23 |
| Example #8 | 80 AA/20 IA | 3810 | 24 |

*DETPMP = diethylenetriaminepenta(methylene phosphonate); FW = formula weight.
**AA = Acrylic Acid; MAA = Methacrylic Acid IA = Itaconic Acid The data demonstrates that the itaconic acid polymers and copolymers of this invention are twice as effective at inhibiting the formation of barium sulfate (higher numbers indicate better performance), when compared to a polyacrylic acid homopolymer of comparable molecular weight and DETPMP, a commonly used commercial phosphonate scale inhibitor.

Liquid Detergent Formulation and Performance Evaluation

The performance of the polymers of this invention in a commercial liquid detergent formulation was evaluated by washing cotton, polyester/cotton blend (65/35) and polyester soiled fabrics in a commercially available, heavy duty liquid detergent utilizing Sears Kenmore ® Ultra Fabric Care brand washing machines (model Heavy Duty 80 Series) set to typical U.S. laundering parameters. Washing conditions, soil/fabric combinations and polymer concentration are detailed in Tables I and II, and the liquid detergent formulation base used for evaluating the copolymers of the invention is illustrated in Table III.

Soiled cloths were prepared (except where noted) by Scientific Services (Oakland, NJ) and cut to a specified size ($3\frac{1}{2}'' \times 4\frac{1}{2}''$). Reflectance was measured using a Pacific Scientific Colorimeter (Colorgard System 1000) and the data recorded using the L, a, b color scale. The reflectance (L) of the soiled cloths was measured before laundering so that only cloths of the same reflectance were used in a test.

Reflectance was then measured after laundering to evaluate the efficacy of the detergent and are reported as the average value. In an effort to create realistic soil/fabric combinations encountered in a consumer's wash load, soils were selected from four classes;
Particulates (clays)
Oily/Particulates (collar soils)
Oxidizables (stains)
Enzyme Sensitive (proteinaceous)

Unsoiled cotton swatches and unsoiled polyester swatches were included in the tests to assess the anti-redeposition characteristics of the individual polymers. Each soil/fabric combination was evaluated with four replicates. The data were derived by averaging the reflectance values from all of the swatches stained with a given soil and appear in Table IV and Table V.

| TABLE I |
|---|
| WASH CONDITIONS: |

APPARATUS - SEARS KENMORE BRAND WASHING MACHINE

TABLE I-continued

WASH CONDITIONS:

TEMPERATURE - WARM (95° F.)
HARDNESS - CONVENTIONAL (120 PPM)
AGITATION - HIGH
WASH CYCLE - MEDIUM (10 MIN.),
16.7 GALLONS/LOAD
DETERGENT DOSAGE - RECOMMENDED LEVEL -
½ CUP (130 GRAMS)
POLYMER CONCENTRATION - 3% SOLIDS
(NEUTRALIZED, pH 7)

TABLE II

| SOIL CLASS | SOIL IDENTITY (SWATCH FABRIC) |
|---|---|
| PARTICULATES | *BIG OAK CLAY (COTTON) |
| | *SKIPPACK CLAY (COTTON) |
| | SCIENTIFIC SERVICES CLAY (COTTON) |
| OILY/ PARTICULATES | COSMETIC MAKEUP (COTTON) |
| | DUST/SEBUM (COTTON, PE/COTTON, PE) |
| OXIDIZABLE | GRAPE JUICE (PE/COTTON) |
| | BREWED TEA (PE/COTTON) |
| | GRASS (COTTON) |

*Prepared by applying 0.7-0.8 grams of a 25% clay slurry (in water) of Skippack or Big Oak Clay to a 3½" × 4½" white cotton swatch (Cotton #405 - Test Fabrics) using a China bristle brush (#10). The soil was "painted" onto the cloth inside a 2" diameter circle and allowed to air dry overnight prior to laundering.

TABLE III

| BASE LIQUID DETERGENT FORMULATION | |
|---|---|
| Component | % by weight |
| Surfactants | |
| Linear Dodecylbenzene Sulfonate | 17.00 |
| Alcohol Ethoxylate (Nonionic) | 7.00 |
| Builder | |
| Sodium Citrate | 10.00 |
| Hydrotrope/Solubilizing Agent | |
| Monoethanolamine | 2.00 |
| Misc.* and Water | up to 100% |

*Misc. includes perfume, colorants, fatty acids, fluorescent whiteners and opacifiers.

Table IV illustrates the evaluation of the polyitaconic acid homopolymer of Example #3 and a pair of 80/20 Acrylic Acid/Itaconic Acid copolymers (Acrylic Acid/Itaconic Acid in a commercial heavy-duty liquid detergent).

TABLE IV

| REFLECTANCE (Y) - VALUES WITH 3% POLYMER | | | |
|---|---|---|---|
| | STAIN* | | |
| Polymer | A | B | C |
| Control: No Polymer | 63 | 67.3 | 63.1 |
| Example #3 | 63.9 | 71.3 | 64.3 |
| Control: No Polymer | 67.3 | 67.7 | 64.8 |
| Example #8 | 68.1 | 70.8 | 64.9 |
| Example #8 | 68.0 | 71.2 | 64.7 |

*A = Oily Particulate Stain
B = Oxidizable Stain
C = Particulate Stain

Polyitaconic homopolymer exhibits some improvements on oily/particulate and particulate soils but shows significant benefits on stain removal.

The Acrylic Acid/Itaconic Acid (80/20) copolymers display an almost analogous performance profile to the polyitaconic homopolymer, except benefits on particulates and oily/particulates are less significant.

The polyitaconic acid homopolymer was evaluated in a prototypical non-phosphate powder composition utilizing a higher polymer concentration, four percent by weight, slightly higher water hardness (125 ppm) and one cup of detergent base (130 grams). The results of the test are illustrated below in Table V.

TABLE V

| REFLECTANCE (Y) - VALUES WITH 4% POLYMER | | | |
|---|---|---|---|
| | STAIN | | |
| Polymer | A | B | C |
| Control: No Polymer | 66.8 | 67.0 | 62.2 |
| Example #3 | 70.4 | 68.0 | 62.4 |

Significant improvements are exhibited on dust-/sebum (collar soil) removal on all three fabrics (cotton, polyester/cotton blend and polyester).

Evaluation Of Polyitaconic Acid As A Clay Dispersant

The polymer of Example 3 was also evaluated as a clay dispersant and compared to a conventional clay dispersant. The test procedure was as follows:

1. RUW® kaolin clay (Trademark of Englehard Corp.) was dried at 70° C. for three days and was sifted to remove any particles larger than 20 U.S. Standard mesh (850 micrometers).
2. A dispersant solution was prepared by adding polymer, soda ash (to control pH), and diluting with deionized water such that the solution contained 15.0 percent by weight polymer solids and 10.0 percent by weight soda ash solids.
3. 5.0 grams of the dispersant solution was diluted to 214.3 grams with deionized water.
4. 500 grams of the dried sifted clay was added to the diluted dispersant solution and the clay was mixed with a spatula until thoroughly wetted.
5. The mixture was then stirred at high speed for five minutes using a Hamilton Beach brand multimixer. The mixture was allowed to cool at room temperature for two hours.
6. The mixture was then mixed for one minute at low speed and the viscosity was measured.
7. 0.33 grams of the dispersant solution was added to the mixture.
8. The mixture was then mixed for one minute at low speed and the viscosity was measured.

Steps 7 and 8 were repeated several times to find the minimum slurry viscosity.

The data which appears in Table VI below shows that the itaconic copolymer works well as a dispersant as indicated by the minimum slurry viscosity. Furthermore, the minimum viscosity was maintained over a wide range of polymer levels allowing a wide operating window when using the itaconic copolymer as a dispersant.

TABLE VI

| | Slurry Viscosity, cps[1] | | | | | | | | |
|---|---|---|---|---|---|---|---|---|---|
| | Dispersant Level[2] | | | | | | | | |
| | 0.15 | 0.16 | 0.17 | 0.18 | 0.19 | 0.20 | 0.21 | 0.22 | 0.23 |
| Acusol® 445N[3] | 515 | 384 | 340 | 332 | 358 | 383 | | | |
| Example 3 | 1200 | 840 | 745 | 384 | 302 | 298 | 298 | 312 | 305 |

[1]Brookfield RVTDV-II (#2 spindle, 20 rpm, 23° C.)
[2]Percent Polymer Solids On Dry Clay
[3]Acusol is a registered trademark of the Rohm and Haas Co. Acusol® 445N is a fully neutralized acrylic acid homopolymer with molecular weight 4,500.

We claim:

1. A process for preparing polymers of salts of itaconic acid comprising:
   (a) adding a monomer solution previously completely neutralized with a water soluble base to a reactor initially charged with water;
   (b) adding thereto under uniform addition rates, an initiator solution comprising 0.5 to 20 percent by weight of active initiator on monomer; and
   (c) running the reactor at a temperature from about 80 to 200 degrees centigrade.

2. The process of claim 1 wherein the degree of neutralization of the itaconic acid is from about 80 to 100 equivalent percent.

3. The process of claim 1 wherein the monomer solution is contained in the initial charge.

4. The process of claim 1 wherein the monomer solution is cofed into the initial charge linearly and as a separate solution during the addition of the initiator.

5. The process of claim 1 wherein the initiator concentration ranges from about 1.0 to 10 percent by weight based on the total amount of monomer and wherein the initiator is selected from the group consisting of sodium persulfate, potassium persulfate, ammonium persulfate, sodium perphospates, potassium perphosphates, ammonium perphosphates, tertiary hydrogen butyl peroxide and hydrogen peroxide.

6. The process of claim 1 wherein the initiator is sodium persulfate.

7. The process of claim 1 wherein said polymerization is run at solids levels in the range from 30 to 80 percent by weight based on the total amount of monomer.

8. The process of claim 1 wherein said polymerization is run at solids levels in the range from 30 to 60 percent by weight based on the total amount of monomer.

* * * * *